H. MOYA.
TYPE WRITER OF THE TYPE BAR CLASS.
APPLICATION FILED APR. 6, 1908.

921,269.

Patented May 11, 1909.
8 SHEETS—SHEET 1.

UNITED STATES PATENT OFFICE.

HIDALGO MOYA, OF LEICESTER, ENGLAND, ASSIGNOR TO IMPERIAL TYPEWRITER COMPANY LIMITED, OF LEICESTER, ENGLAND.

TYPE-WRITER OF THE TYPE-BAR CLASS.

No. 921,269.        Specification of Letters Patent.       Patented May 11, 1909.

Application filed April 6, 1908. Serial No. 435,459.

*To all whom it may concern:*

Be it known that I, HIDALGO MOYA, a citizen of the United States of America, residing at Leicester, England, have invented certain new and useful Improvements in Type-Writers of the Type-Bar Class, of which the following is a specification.

This invention relates to improvements in type-writers of the type-bar class and the objects are to simplify the construction of the key-lever mechanism and the operation of the type-bars thereby and to provide simple means for shifting the type-bar mechanism in relation to the platen by a shift-key and for swinging the whole key-lever and type-bar system clear of the remainder of the machine or for separating them entirely.

According to this invention each of the type-bars (which are normally vertical) is combined with a floating key-lever constrained to move up and down and having an arm engaging the type-bar to turn the same and a spring is arranged to restore the type-bar and key-lever to their normal positions. The key-lever may be in the form of a floating bell-crank lever having an approximately vertical slot engaging a fixed rail; an arm of the key-lever engages a recess in the type-bar near its pivot and a spring connects the type-bar with the key-lever and tends to maintain them in their normal positions. This arrangement is such that as the key-lever is depressed and the type-bar turns, the spring while bodily descending at the same time extends; and when the key-lever is released the contraction of the spring raises both type-bar and key-lever to their original positions. Each type-bar may have a cam-shaped end arranged to engage a universal bar which operates the escapement of the platen carriage, so that the depression of each key-lever effects the desired travel: it is thus possible for the key-lever and type-bar mechanism to be entirely self-contained and separate from the fixed base comprising the carriage and ribbon mechanism. The upper frame carrying the key-lever and type-bar system may be entirely detachable from the rest of the machine so that type sets for different languages may be substituted on the same machine together with a key-board suitable for the language. In a machine having two or more types on the one type-bar, the frame carrying the key-lever and type-bar mechanism is connected to the fixed base by pivoted arms and a shift-key is arranged to move said frame into different positions in relation to the platen.

In the accompanying drawings which illustrate by way of example one form of type-writer embodying this invention.

Like letters indicate like parts throughout the drawings.

On a fixed base A is mounted any suitable well known form of platen carriage having the usual platen or impression roller B, the appurtenances of which form no part of this invention and are not illustrated in detail.

Figure 1:
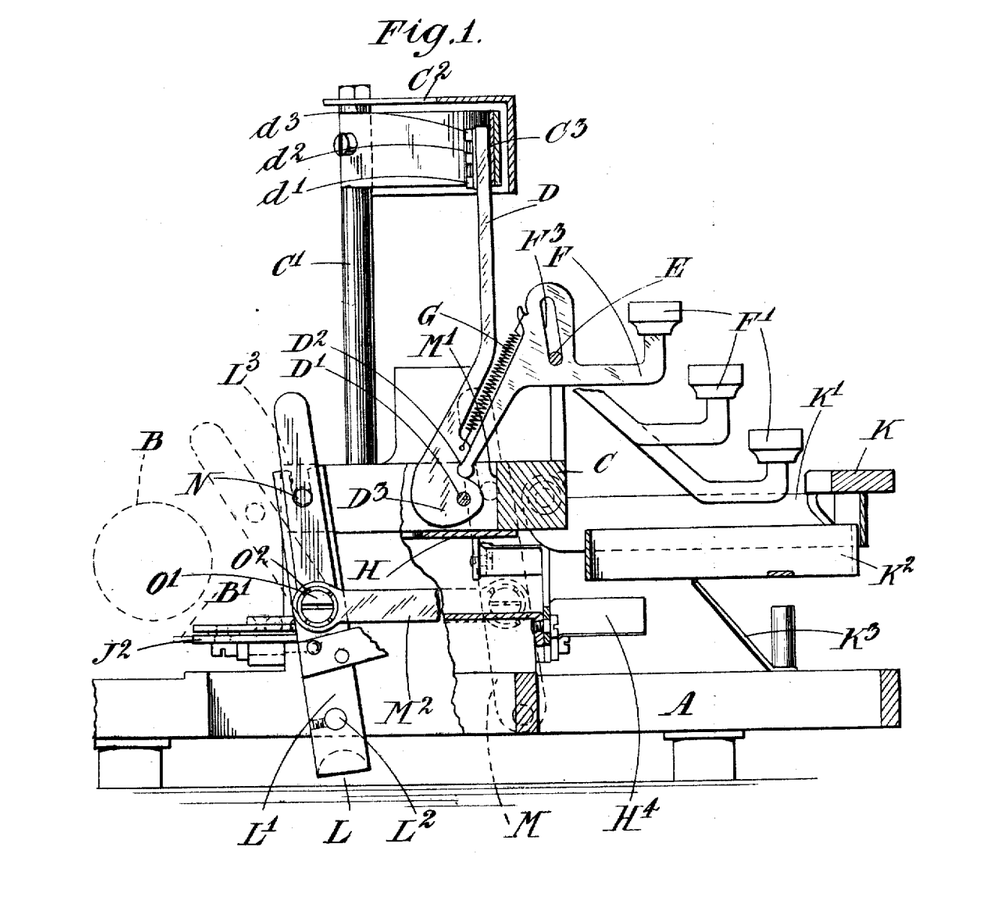
—Figure 1 is a central vertical section of the machine in normal position.
Figure 2:
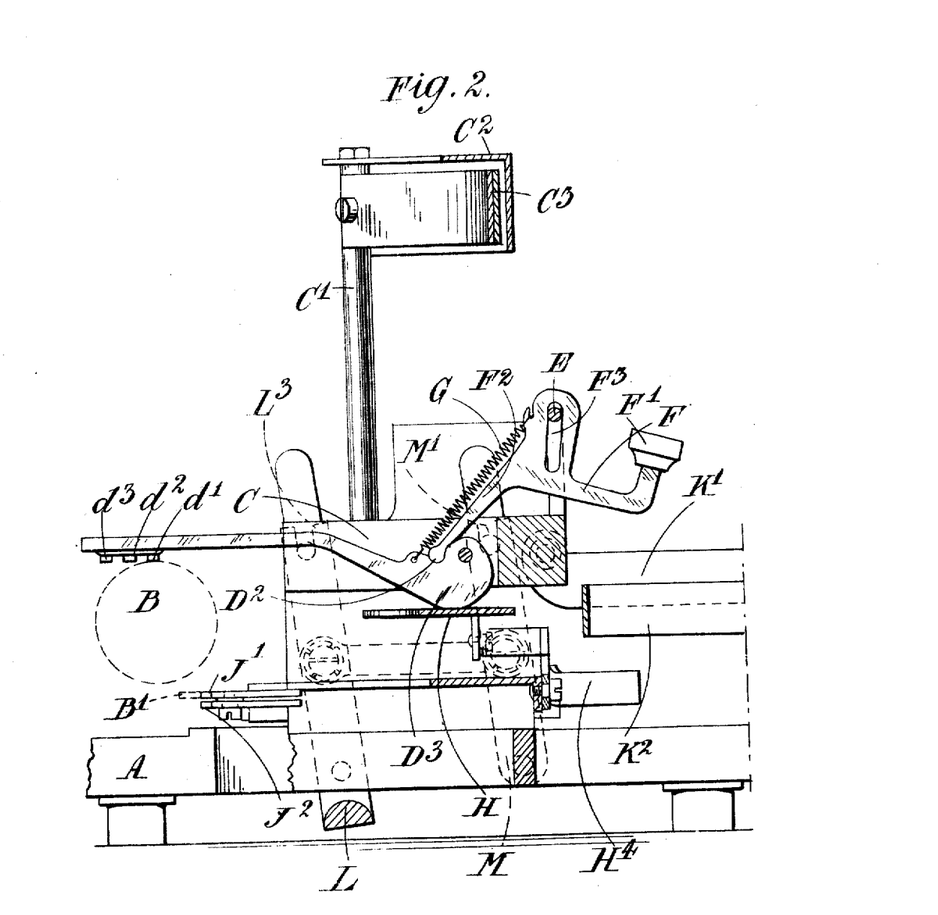
Fig. 2 is a similar view showing one type-bar and key-lever in depressed position.

An upper frame C is mounted on the base A and the connection between them will be described hereinafter. The lower and main part of the frame C is an arc-shaped block on which the type-bar and key-lever mechanism is carried. At the ends of this block are vertical rods $C^1$ carrying a cover $C^2$ for the type, and a pad $C^3$ against which the type bars normally lie. Each type bar D is pivoted at $D^1$ in the frame C and in the arrangement illustrated carries three types $d^1$ $d^2$ $d^3$. On the front of the frame C is mounted a fixed rail E to serve as a guide for the key-levers F. Each key-lever F has the usual key $F^1$ and has an arm $F^2$ terminating in a rounded end which engages with a recess $D^2$ in the type bar D close to the pivot $D^1$. An approximately vertical slot $F^3$ is formed in the key-levers and engages the fixed rail E. A spring G connects the upper part of the key-lever F with a point on the type-bar D so that the arm $F^2$ engages the type-bar between the pivot $D^1$ and the point of application of the spring. The spring G is in tension and it tends therefore to maintain the key-lever F and the type-bar D in the position in which the spring is contracted, that is the normal position illustrated in Fig. 1. When the key F¹ is depressed the lower end of the arm F² moves around the pivot D¹ through a quarter of a turn and the key-lever as a whole moves bodily down and is guided by the engagement of the rail E with the slot F³. During this depression the spring G is extended as shown in Fig. 2. When the pressure on the key is released the spring G contracts and the type-bar and key-lever return to their normal position. There are several important advantages in this arrangement, one is the absence of mechanism between the key-lever and the type-bar, another is that the key-lever can be made very short and simple in construction, and a third is that the total extension of the spring is small and the spring can therefore be made comparatively strong.

Various devices may be used for maintaining the alinement of the parts. Thus the block C may be extended to form a comb which engages the lower part of all the type bars D and prevents lateral play thereof. The usual guides may be provided immediately above the platen B. Each type bar D has a cam portion D³ at its lower end arranged to engage a universal bar H mounted beneath the type bars.

Figure 4:
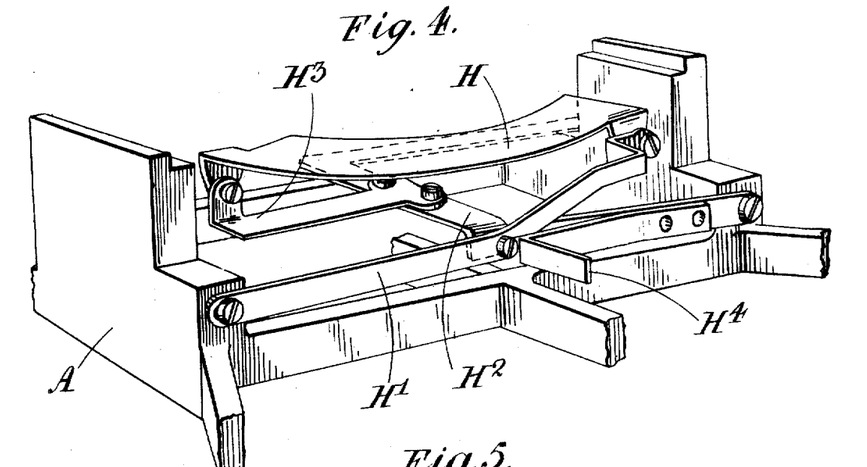
Fig. 4 is a perspective view of the universal escapement bar and its supports.
Figure 5:
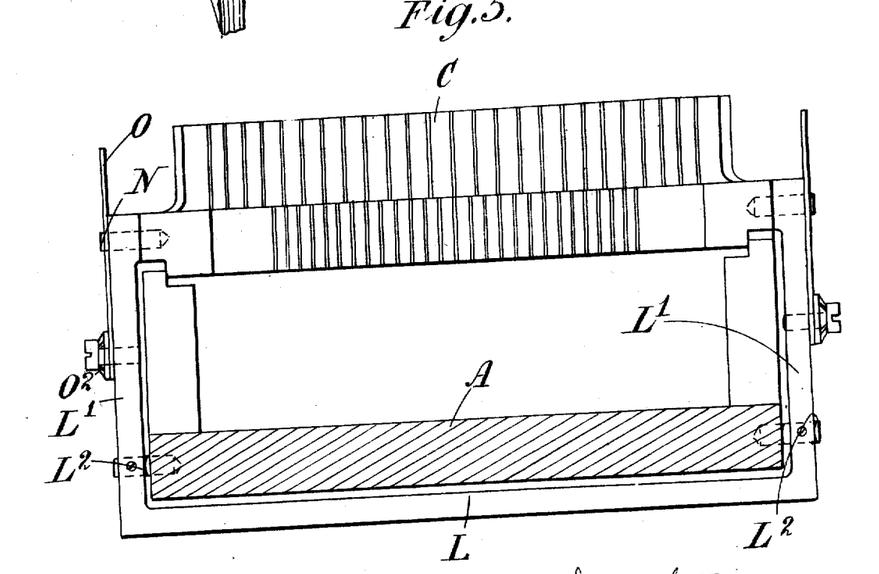
Fig. 5 is a part vertical section showing the arrangement of the sliding block on the fixed frame.

The method of mounting the universal bar is illustrated in Fig. 4. One arm H¹ is pivoted to the left-hand side of the frame and to the right-hand side of the universal bar. The frame H² is pivoted to the right-hand side of the base and carries an arm H³ pivoted to the left-hand side of the universal bar and the bar H¹ is pivoted to the frame H². The bar H¹ is slotted at its left-hand pivot where it is attached to the base A and the arm H³ is slotted at the pivot where it is attached to the left-hand side of the universal bar to give the pivots a certain amount of play. A strip H⁴ projects from the frame H². The depression of the universal bar H operates an escapement for the platen carriage in any usual way. For example it may carry a fixed tooth J¹ and a spring-controlled tooth J², one above the other, arranged to engage alternately with the rack B¹ of the carriage so that as the universal bar H moves up and down the escapement of the carriage is operated in a well known way. The space key K carried by a pivoted frame K¹ has a projection K² controlled by a spring K³ and arranged to engage the strip H⁴ and actuate the escapement.

The method by which the upper frame C is mounted on the base A will be clear from Figs. 1, 2, 3 and 5. The object is to enable the upper frame C to be readily and entirely removed together with the type-bars and key-levers. A carrier L having vertical arms L¹ at its ends is pivoted to the main frame A at L² and the arms L¹ have slots L³ in their upper ends. Idler arms M one on each side of the machine are attached in like manner to the base A and also have slots M¹ in their upper ends. The links M² one at each side connect L¹ and M and hold them in such relation to each other as to permit the four pins N projecting from the block C to engage four spring arms O pivoted at O¹ and having suitable holes to engage the pins N. Spring washers O² hold the arms O normally in position. By pressing the four arms O outward they are released from the pins N and the whole upper part of the machine is then free to be removed.

Figure 6:
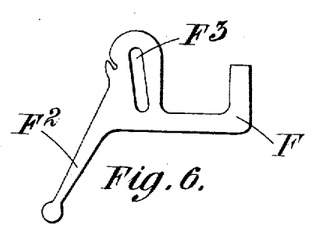
Figs. 6, 7 and 8 illustrate the shape of the key-levers of the first, second and third rows respectively.
Figure 7:
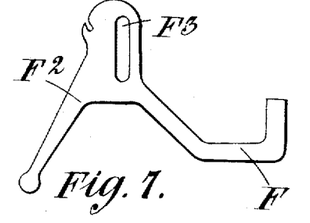
Figure 8:
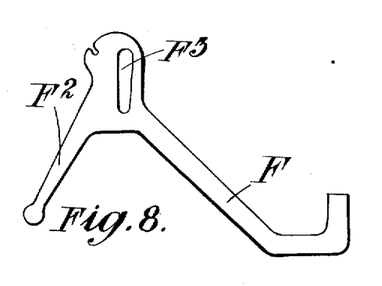

It is desirable that the depression required for all the key-levers in the machine should be the same. It will be appreciated that owing to the different lengths of the key-levers in the different rows, special means have to be provided to insure this. In the present construction equal depression of the key-levers is obtained by varying the inclination of the approximately vertical slots F³; thus in the top row of key-levers the slot F³ may be slightly inclined downward and forward. In the key-levers of the middle row the slot F³ can be made vertical and in the key levers of the bottom row the slot F³ may be slightly inclined downward and backward.

Figure 3:
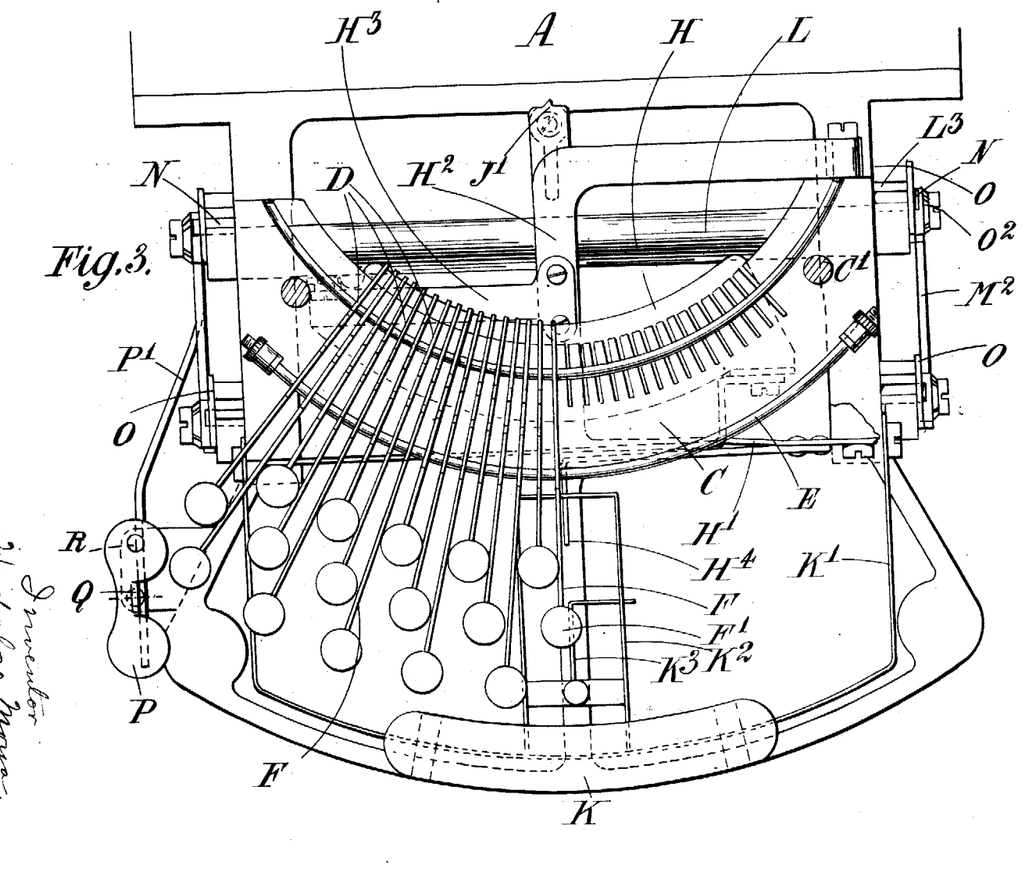
Fig. 3 is a plan of a machine.
Figure 11:
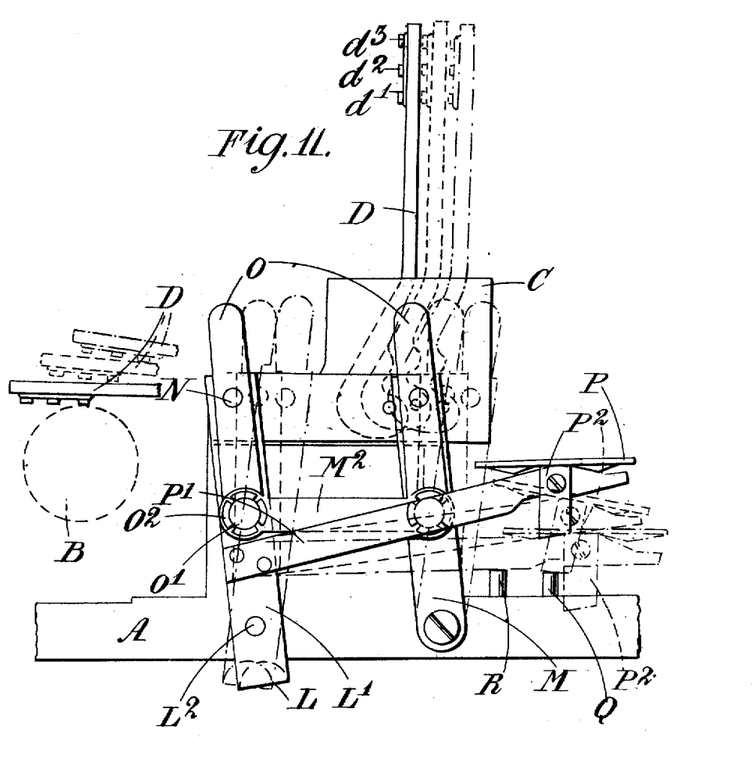
Fig. 11 is a side view showing the operation of the shift key.

The method of shifting from one set of characters to another is shown in Figs. 3 and 11. A shift-key P is pivoted to a link P¹ fixed to one of the arms M and the shift-key has a central finger P² projecting downward. The shift-key is normally in its highest position in which case the types d¹ are in operative position. When the front portion of the shift-key is pressed downward the finger P² engages a stop Q on the base and the upper sliding frame is pulled forward sufficiently to bring the center types d² into operative position. When, on the other hand the back portion of the shift-key is pushed down, the finger P² does not engage the stop Q but the link P¹ engages a stop R and brings the uppermost set of types d³ into operative position.

Figure 9:
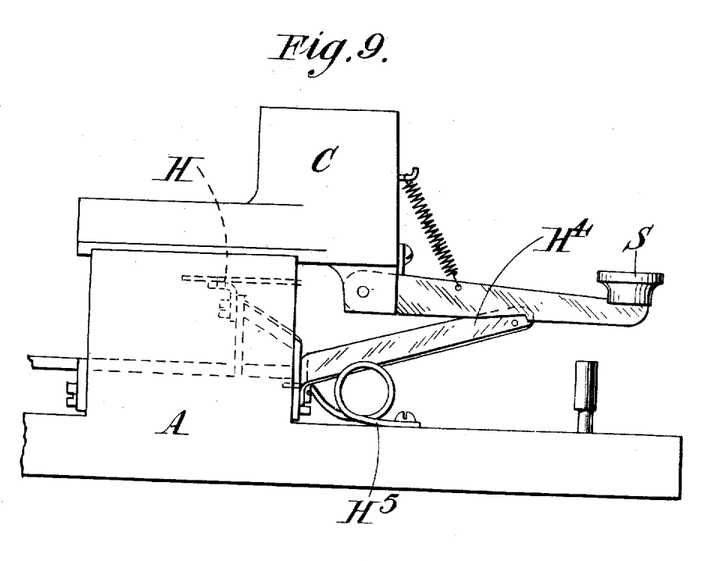
Figs. 9 and 10 are elevation and plan illustrating a modified arrangement of space bar.
Figure 10:
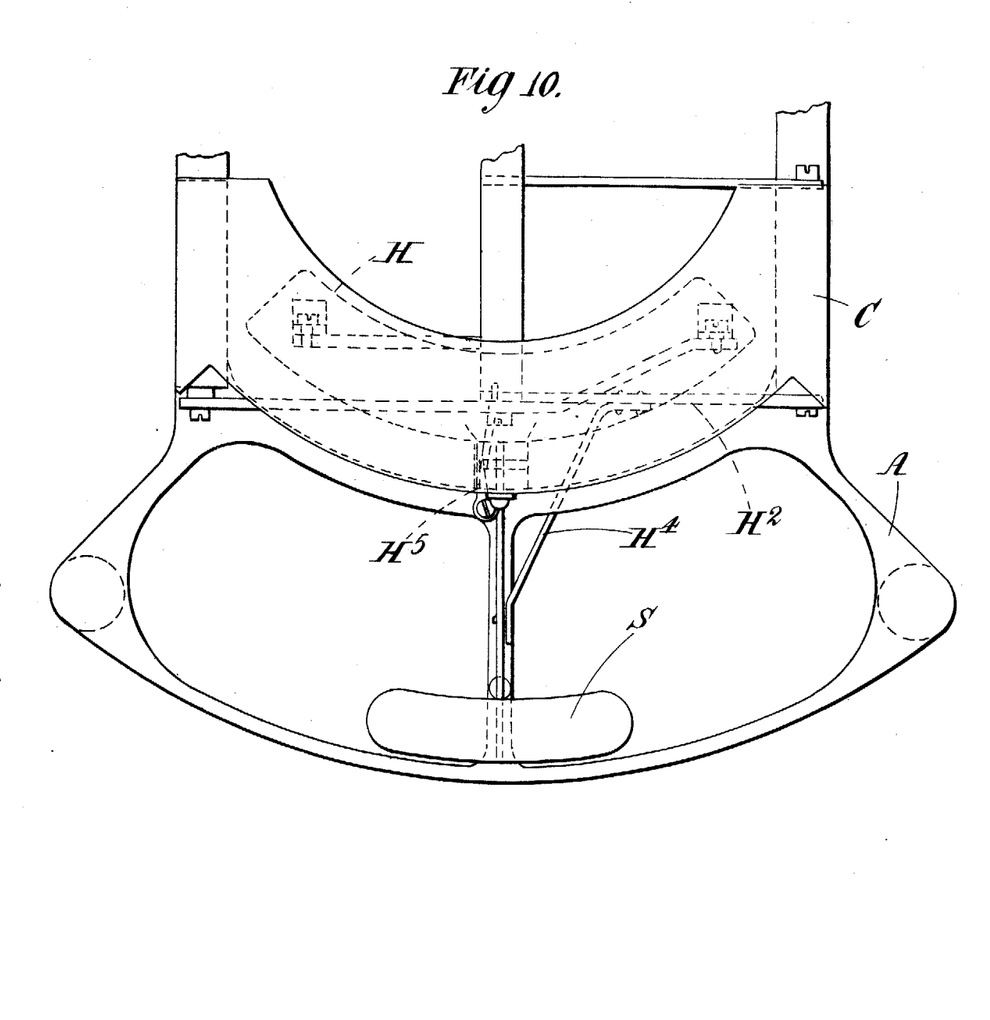

In Figs. 9 and 10 which illustrate a modified arrangement of the space-bar, the space-bar S is supported on a spring-controlled lever pivoted at the center of the sliding frame C and arranged to engage a strip H⁴ projecting from the frame H². A wire spring H⁵ fixed to the base A engages the under side of the frame H² and is arranged to restore the universal bar to its normal position after each depression.

What I claim as my invention and desire to secure by Letters Patent is:—

1. In a typewriter the combination of a frame, a type-bar pivoted in said frame, a bell-crank key-lever having an arm pivotally engaging said type bar near its pivot, means constraining the key-lever to move vertically and to turn, and a spring arranged to restore the type-bar and key-lever to their normal positions.

2. In a typewriter the combination of a frame, a type-bar pivoted in said frame, a bell-crank key-lever having an arm forming a knuckle joint with said type-bar near its pivot, means constraining the key-lever to move vertically and to turn about said joint, and a spring arranged to restore the type-bar and key-lever to their normal positions.

3. In a typewriter the combination of a frame, a type-bar pivoted in said frame, a bell-crank key-lever having an arm forming a knuckle joint with said type-bar near its pivot, means constraining the key-lever to move vertically and to turn about said joint, and a spring connecting the type-bar with the key-lever.

4. In a typewriter the combination of a frame, a type-bar pivoted in said frame, a bell-crank key-lever having an arm forming a knuckle joint with said type-bar near its pivot, means constraining the key-lever to move vertically and to turn about said joint, a spring connecting the type-bar with the key-lever, paper-carrying devices movably supported in the frame, escapement mechanism controlling the same, and a movable universal bar operatively connected with the escapement mechanism and disposed in the path of the moving parts of all the type mechanism when depressed.

5. In a typewriter the combination of a frame, a type-bar pivoted in said frame, a plurality of rows of bell-crank key-levers each having an arm forming a knuckle joint with the corresponding type-bar near its pivot, means constraining the key-levers to move vertically and to turn about said joints, means for varying the vertical movement of the key-levers in the different rows and a spring connecting each type-bar with the corresponding key-lever.

6. In a typewriter the combination of a frame, a series of type-bars pivoted in said frame, a plurality of rows of bell-crank key-levers each having an arm forming a knuckle joint with the corresponding type-bar near its pivot, means constraining the key-levers to move vertically and to turn about said joints, means for varying the vertical movement of the key-levers in the different rows, a spring connecting each type-bar with the corresponding key-lever, paper-carrying devices movably supported in the frame, escapement mechanism controlling the same, and a movable universal bar operatively connected with the escapement mechanism and disposed in the path of the moving parts of all the type mechanism when depressed.

7. In a typewriter the combination of a fixed base, an upper frame detachably connected to said base and movable to and fro in relation thereto, a series of type-bars pivoted in said upper frame each type-bar carrying several types, a plurality of bell-crank key-levers each having an arm forming a knuckle joint with the corresponding type-bar near its pivot, means constraining the key-levers to move vertically and to turn about said joints, a spring connecting each type-bar with the corresponding key-lever and means for shifting said upper frame into one of several positions corresponding respectively with the operative positions of said several types.

8. In a typewriter the combination of a fixed base, an upper frame detachably connected to said base and movable to and fro in relation thereto, a series of type-bars pivoted in said frame each type-bar carrying several types, a plurality of rows of bell-crank key-levers, each having an arm forming a knuckle joint with the corresponding type-bar near its pivot, means constraining the key-levers to move vertically or to turn about said joints, means for varying the vertical movement of the key-levers in the different rows, a spring connecting each type-bar with the corresponding key-lever, platen escapement mechanism, a movable universal bar operatively connected with the escapement mechanism and disposed in the path of the moving parts of all the type mechanism when depressed, and means for shifting said upper frame into one of several positions corresponding respectively with the operative positions of said several types.

9. In a typewriter the combination of a fixed base, an upper frame detachably connected to said base and movable to and fro in relation thereto, a series of type-bars pivoted in said frame each type-bar carrying several types, a plurality of rows of bell-crank key-levers, each having an arm forming a knuckle joint with the corresponding type-bar near its pivot, means constraining the key-levers to move vertically or to turn about said joints, means for varying the vertical movement of the key-levers in the different rows, a spring connecting each type-bar with the corresponding key-lever, platen escapement mechanism, a movable universal bar operatively connected with the escapement mechanism and disposed in the path of the moving parts of all the type mechanism when depressed, a shift-key operatively connected to said upper frame and means for arresting said upper frame in one of several positions corresponding respectively with the operative positions of said several types.

10. In a typewriter the combination of a fixed base, an upper frame detachably connected to said base and movable to and fro in relation thereto, a series of type bars pivoted in said frame each type-bar carrying several types, a plurality of rows of bell-crank key-levers, each having an arm forming a knuckle joint with the corresponding type-bar near its pivot, means constraining the key-levers to move vertically and to turn about said joints, means for varying the vertical movement of the key-levers in the different rows, a spring connecting each type-bar with the corresponding key-lever, platen escapement mechanism, a movable universal bar operatively connected with the escapement mechanism and disposed in the path of the moving parts of all the type mechanism when depressed, a shift-key operatively connected to said upper frame, means for arresting said upper frame in one of several positions corresponding respectively with the operative positions of said several types, and means for guiding the type-bars in said upper frame.

11. A typewriter comprising an upper and lower portion detachably connected with the upper portion movable to and fro in relation to the lower portion, the lower portion comprising a fixed base, platen escapement mechanism and a movable universal bar operatively connected with the escapement mechanism, the upper portion comprising a frame, a series of type-bars pivoted in said frame each type-bar carrying several types, a plurality of rows of bellcrank key-levers each having an arm forming a knuckle joint with the corresponding type-bar near its pivot, a spring connecting each type-bar with the corresponding key-lever, means constraining each key-lever to move vertically or to turn about said joint, means for varying the movement of the key-levers in the different rows, means for guiding the type-bars in said frame, links connecting said upper portion to said base, a shift-key operatively connected to said links and means for arresting said upper frame in one of several positions corresponding respectively with the operative positions of said several types.

12. In a typewriter the combination of a frame, a type-bar normally vertical and pivoted at its lower end in said frame, a horizontal rail in said frame, a bell-crank key-lever engaging said rail by means of an approximately vertical slot and an arm engaging the type-bar near its pivot, and a spring arranged to restore the type-bar and key-lever to their normal positions.

13. In a typewriter the combination of a frame, a type-bar normally vertical and pivoted at its lower end in said frame, a horizontal rail in said frame, a bell-crank key-lever engaging said rail by means of an approximately vertical slot and an arm engaging the type-bar near its pivot, and a spiral spring connecting the upper part of the spiral spring connecting the upper part of the key-lever with the type bar.

14. In a typewriter the combination of a frame, a type-bar normally vertical and pivoted at its lower end in said frame, a horizontal rail in said frame, a bell-crank key-lever engaging said rail by means of an approximately vertical slot and an arm engaging the type-bar in a knuckle joint near its pivot, and a spiral spring connecting the upper part of the key-lever with the type-bar above said joint.

15. In a typewriter the combination of a frame, a type-bar normally vertical and pivoted at its lower end in said frame, a horizontal rail in said frame, a bell-crank key-lever engaging said rail by means of an approximately vertical slot and an arm engaging the type-bar in a knuckle joint near its pivot, a spiral spring connecting the upper part of the key-lever with the type-bar above said joint, a platen escapement mechanism and a universal bar vertically movable mounted beneath all the type bars and operatively connected with the escapement of the impression roller.

16. In a typewriter the combination of a frame, a type-bar normally vertical and pivoted at its lower end in said frame, a horizontal rail in said frame, a bell-crank key-lever engaging said rail by means of an approximately vertical slot and an arm engaging the type-bar in a knuckle joint near its pivot, a spiral spring connecting the upper part of the key-lever with the type-bar above said joint, a platen escapement mechanism, a universal bar vertically movable mounted beneath all the type-bars and operatively connected with the escapement of the impression roller, and a cam at the lower end of each type-bar arranged to engage said universal bar on the depression of the type-bar.

17. In a typewriter the combination of a frame, a series of type-bars normally vertical and pivoted at their lower ends in said frame, a horizontal rail in said frame, a plurality of rows of bell-crank key-levers each having an arm engaging at its end with the corresponding type-bar close to its pivot and engaging said rail by means of an approximately vertical slot, the slots in the key-levers of the different rows having different inclinations, and a spiral spring connecting the upper part of each key-lever with the corresponding type-bar.

18. In a typewriter the combination of a frame, a series of type-bars normally vertical and pivoted at their lower ends in said frame, a horizontal rail in said frame, a plurality of rows of bell-crank key-levers each having an arm engaging at its end with the corresponding type-bar close to its pivot and engaging said rail by means of an approximately vertical slot, the slots in the key-levers of the different rows having different inclinations, a spiral spring connecting the upper part of each key-lever with the corresponding type-bar, a platen escapement mechanism, a universal bar vertically movable mounted beneath all the type-bars and operatively connected with the escapement of the impression roller and a cam at the lower end of each type-bar arranged to engage said universal bar on the depression of the type-bar.

19. In a typewriter the combination of a fixed base, an upper frame detachably connected to said base and movable to and fro in relation thereto, a series of type-bars normally vertical and pivoted at their lower ends in said upper frame, each type-bar carrying three types, a horizontal rail mounted on said upper frame, a plurality of bell-crank key-levers each engaging said rail by means of an approximately vertical slot and having an arm engaging at its end with the corresponding type-bar close to its pivot and a spring connecting the upper part of each key-lever with the corresponding type-bar, a pivoted shift-key operatively connected with said upper frame and having a central finger projecting downward and an abutment on the base arranged to engage said finger when the shift-key is tilted in one direction and depressed.

20. In a typewriter the combination of a fixed base, an upper frame detachably connected to said base and movable to and fro in relation thereto, a series of type-bars normally vertical and pivoted at their lower ends in said upper frame, each type-bar carrying three types, a horizontal rail mounted on said upper frame, a plurality of rows of bell-crank key-levers each having an arm engaging at its end with the corresponding type-bar close to its pivot and engaging said rail by means of an approximately vertical slot, the slots in the key-levers of the different rows having different inclinations, a spring connecting the upper part of each key-lever with the corresponding type-bar, a pivoted shift key operatively connected with said upper frame and having a central finger projecting downward and an abutment on the base arranged to engage said finger when the shift-key is tilted in one direction and depressed.

21. In a typewriter the combination of a fixed base, an upper frame detachably connected to said base and movable to and fro in relation thereto, a series of type-bars normally vertical and pivoted at their lower ends in said upper frame, each type-bar carrying three types, a horizontal rail mounted on said upper frame, a plurality of rows of bell-crank key-levers each having an arm engaging at its end with the corresponding type-bar close to its pivot and engaging said rail by means of an approximately vertical slot, the slots in the key-levers of the different rows having different inclinations, a spring connecting the upper part of each key-lever with the corresponding type-bar, a pivoted shift-key operatively connected with said upper frame and having a central finger projecting downward an abutment on the base arranged to engage said finger when the shift-key is tilted in one direction and depressed, a platen escapement mechanism, a universal bar vertically movable mounted beneath all the type bars and operatively connected with the escapement of the impression roller, and a cam at the lower end of each type bar arranged to engage said universal bar on the depression of the type bar.

22. In a typewriter the combination of a fixed base, a platen escapement mechanism, an upper frame disposed above the base, a carrier having vertical arms pivoted to said base and having slots in their upper ends, vertical idler arms pivoted to said base and having slots in their upper ends, links connecting the carrier arms with the idler arms, pins projecting from the upper frame engaging with the slots in said arms and spring arms fixed to the vertical arms and having holes to engage said pins, a link fixed to one of the carrier arms, a shift-key pivoted to the end of said link and having a central finger projecting downward and an abutment on the base arranged to engage said finger when the shift-key is tilted in one direction and depressed, a series of type-bars normally vertical and pivoted at their lower ends in said upper frame, each type-bar carrying three types, a horizontal rail mounted on said upper frame, a plurality of rows of bell-crank key-levers each having an arm engaging at its end with the corresponding type-bar close to its pivot and having an approximately vertical slot engaging said rail, the slots in the key-levers of the different rows having different inclinations, a spring connecting the upper part of each key-lever with the corresponding type-bar, a comb on the upper frame engaging and guiding the lower parts of the type-bars, a universal bar vertically movable mounted beneath all the type-bars and operatively connected with the escapement of the impression roller, a cam at the lower end of each type-bar arranged to engage said universal bar on the depression of the type-bar and a space-key arranged to operate the universal bar when depressed.

In testimony whereof I have signed my name to this specification in the presence of two subscribing witnesses.

HIDALGO MOYA.

Witnesses:
CECIL DASHWOOD FROST,
ARCHIBALD SMITH.